(12) United States Patent
Saxena et al.

(10) Patent No.: US 9,391,915 B2
(45) Date of Patent: Jul. 12, 2016

(54) CONTROLLING BANDWIDTH ACROSS MULTIPLE USERS FOR INTERACTIVE SERVICES

(71) Applicant: Microsoft Technology Licensing LLC, Redmond, WA (US)

(72) Inventors: Anurekh Saxena, Normandy Park, WA (US); Costin Hagiu, Sammamish, WA (US); Rajneesh Mahajan, Woodinville, WA (US); Sanjeev Mehrotra, Kirkland, WA (US); Benjamin Homelson Meister, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/923,055

(22) Filed: Jun. 20, 2013

(65) Prior Publication Data

US 2014/0379910 A1 Dec. 25, 2014

(51) Int. Cl.
*H04L 29/06* (2006.01)
*H04L 12/911* (2013.01)
(Continued)

(52) U.S. Cl.
CPC ............. *H04L 47/70* (2013.01); *H04L 47/215* (2013.01); *H04L 47/72* (2013.01); *H04L 47/20* (2013.01); *H04L 47/762* (2013.01); *H04L 47/805* (2013.01); *H04L 47/823* (2013.01); *H04L 47/828* (2013.01)

(58) Field of Classification Search
CPC ..................................................... H04L 29/06
USPC ........................................................ 709/225
See application file for complete search history.

(56) References Cited

U.S. PATENT DOCUMENTS 7,327,682 B2 2/2008 Gandhi et al.
7,602,721 B1 10/2009 Tangirala et al.
(Continued)

FOREIGN PATENT DOCUMENTS

EP 1796332 A1 6/2007

OTHER PUBLICATIONS

Raghavan, et al., "Cloud Control with Distributed Rate Limiting", In Proceedings of Conference on Applications, Technologies, Architectures, and Protocols for Computer Communications, Aug. 27, 2007, 12 pages.
(Continued)

*Primary Examiner* — Vivek Srivastava
*Assistant Examiner* — Sibte Bukhari
(74) *Attorney, Agent, or Firm* — Kate Drakos; Harri Valio; Micky Minhas

(57) ABSTRACT

Embodiments are directed to controlling bandwidth usage using a token-based crediting and debiting scheme and to allowing connections to temporarily exceed bandwidth allocations using token credits. In one scenario, a bandwidth managing service receives a request to establish a connection with a network. The connection is associated with various subscribers that are part of a subscription. The bandwidth managing service assigns tokens to the connection, which are distributed from a pool of tokens that represents a total available bandwidth for the network. The bandwidth managing service receives a data transfer request from a logical user to transfer data over the network connection, where the data transfer request includes at least some of the assigned tokens. The bandwidth managing service also allocates to the connection a specified amount of bandwidth commensurate with the number of assigned tokens provided in the data transfer request.

19 Claims, 4 Drawing Sheets

(51) Int. Cl.
*H04L 12/819* (2013.01)
*H04L 12/813* (2013.01)
*H04L 12/923* (2013.01)
*H04L 12/927* (2013.01)

(56) References Cited

U.S. PATENT DOCUMENTS

| | | | |
|---|---|---|---|
| 8,656,043 B1* | 2/2014 | Wieder | 709/231 |
| 2002/0049841 A1* | 4/2002 | Johnson et al. | 709/225 |
| 2003/0046396 A1* | 3/2003 | Richter et al. | 709/226 |
| 2005/0174944 A1 | 8/2005 | Legault et al. | |
| 2007/0073878 A1* | 3/2007 | Issa | 709/225 |
| 2007/0177504 A1 | 8/2007 | Iwata et al. | |
| 2009/0285095 A1 | 11/2009 | Baden et al. | |
| 2013/0003543 A1 | 1/2013 | Ludwig | |

OTHER PUBLICATIONS

Zhu, et al., "Towards Bandwidth Guarantee in Multi-tenancy Cloud Computing Networks", In 20th IEEE International Conference on Network Protocols, Oct. 30, 2012, 10 pages.

Liou, Chris, "Enabling Dynamic, Rapid & Cost Effective End to End bandwidth from Metro Edge to Waters Edge", Published on: Apr. 18, 2011, Available at: http://www.infinera.com/technology/files/infinera-Dynamic_Bandwidth-liou.pdf.

Jin, et al., "Cloud Assisted P2P Media Streaming for Bandwidth Constrained Mobile Subscribers", In 16th International Conference on Parallel and Distributed Systems, Dec. 8, 2010, 6 pages.

Clark, Jeff, "Bandwidth Limitations and the Cloud", Published on: May 18, 2012, Available at: http://www.datacenterjournal.com/it/bandwidth-limitations-and-the-cloud/.

"Cisco Quantum Policy Suite: Efficiently Optimize and Monetize Data Services", Published on: Mar. 9, 2013, Available at: http://www.cisco.com/en/US/solutions/collateral/ns341/ns973/ns1081/ns1091/solution_overview_c22-609897_ns973_Networking_Solution_Solution_Overview.html.

"Qualcomm Introduces StreamBoost Technology to Optimize Performance and Capacity of Home Networks", Published on: Jan. 4, 2013, Available at: http://www.qualcomm.com/media/releases/2013/01/04/qualcomm-introduces-streamboost-technology-optimize-performance-and.

"International Search Report & Written Opinion Issued in PCT Patent Application No. PCT/US2014/043027", Mailed Date: Dec. 17, 2014, 17 Pages.

"International Preliminary Report on Patentability Issued in PCT Patent Application No. PCT/US2014/043027", Mailed Date: Sep. 9, 2015, 8 Pages. (MS∩ 339338.02).

* cited by examiner

CONTROLLING BANDWIDTH ACROSS MULTIPLE USERS FOR INTERACTIVE SERVICES

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed be run on the cloud. For instance, remote desktop applications may be provided by a private or public-facing cloud computing host. These remote applications are typically provided to users who have subscribed to access and use those applications. The user's access to these applications is typically metered, with each portion of transferred data being measured and tallied. To prevent users from consuming too much bandwidth, their connections are often throttled, resulting in a potentially degraded experience.

BRIEF SUMMARY

Embodiments described herein are directed to controlling bandwidth usage using a token-based crediting and debiting scheme and to allowing connections to temporarily exceed bandwidth allocations using token credits. In one embodiment, a bandwidth managing service receives a request to establish a connection with a network. The connection is associated with various subscribers that are part of a subscription. The bandwidth managing service assigns tokens to the connection, which are distributed from a pool of tokens that represents a total available bandwidth for the network. The bandwidth managing service receives a data transfer request from a logical user to transfer data over the network connection, where the data transfer request includes at least some of the assigned tokens. The bandwidth managing service also allocates to the connection a specified amount of bandwidth commensurate with the number of assigned tokens provided in the data transfer request. In some cases, the bandwidth managing service further monitors the connection's data usage over a specified period of time and distributes tokens upon determining that the connection is substantially likely to request subsequent additional tokens.

In another embodiment, a computer system performs a method for allowing connections to temporarily exceed bandwidth allocations using token credits. The computer system determines that a bandwidth managing service has been instantiated. The bandwidth managing service is configured to assign tokens to requesting connections, where the tokens are distributed from a pool of tokens that represents a total available bandwidth for a network. The bandwidth managing service determines that a specified connection has used less than an allocated, aggregated amount of bandwidth over a specified period of time and stores the tokens allocated to the connection. As such, the tokens form credits from which bandwidth for data transfers is to be drawn. The bandwidth managing service further receives a data request from the connection, which includes at least some of the stored tokens, indicating that credits are to be used to receive bandwidth allocation for a data transfer. The bandwidth managing service also allocates a specified amount of network bandwidth to the connection commensurate with the stored tokens received in the data request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
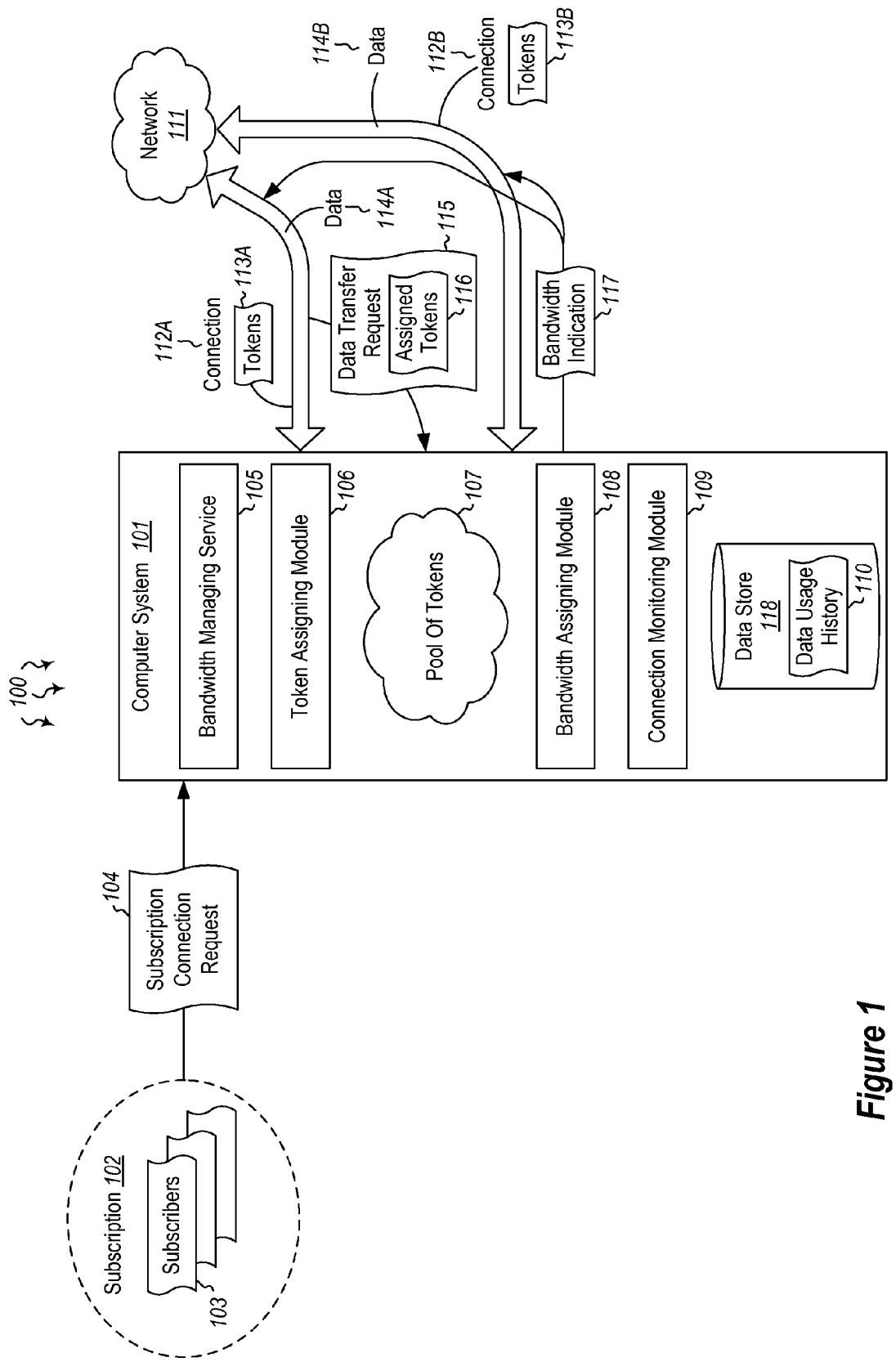
FIG. 1 illustrates a computer architecture in which embodiments described herein may operate including controlling bandwidth usage using a token-based crediting and debiting scheme.

Embodiments described herein are directed to controlling bandwidth usage using a token-based crediting and debiting scheme and to allowing connections to temporarily exceed bandwidth allocations using token credits. In one embodiment, a bandwidth managing service receives a request to establish a connection with a network. The connection is associated with various subscribers that are part of a subscription. The bandwidth managing service assigns tokens to the connection, which are distributed from a pool of tokens that represents a total available bandwidth for the network. The bandwidth managing service receives a data transfer request from a logical user to transfer data over the network connection, where the data transfer request includes at least some of the assigned tokens. The bandwidth managing service also allocates to the connection a specified amount of bandwidth commensurate with the number of assigned tokens provided in the data transfer request. In some cases, the bandwidth managing service further monitors the connection's data usage over a specified period of time and distributes tokens upon determining that the connection is substantially likely to request subsequent additional tokens.

In another embodiment, a computer system performs a method for allowing connections to temporarily exceed bandwidth allocations using token credits. The computer system determines that a bandwidth managing service has been instantiated. The bandwidth managing service is configured to assign tokens to requesting connections, where the tokens are distributed from a pool of tokens that represents a total available bandwidth for a network. The bandwidth managing service determines that a specified connection has used less than an allocated, aggregated amount of bandwidth over a specified period of time and stores the tokens allocated to the connection. As such, the tokens form credits from which bandwidth for data transfers is to be drawn. The bandwidth managing service further receives a data request from the connection, which includes at least some of the stored tokens, indicating that credits are to be used to receive bandwidth allocation for a data transfer. The bandwidth managing service also allocates a specified amount of network bandwidth to the connection commensurate with the stored tokens received in the data request.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system includes modules for performing a variety of different functions. For instance, the bandwidth managing service 105 may be used to monitor and/or manage bandwidth usage for a particular user or group of users. These users may be subscribers to a particular application or set of applications provided by the cloud (e.g. via network 111). The subscribers 103 may thus have a subscription 102 to access cloud services (or other data) via the network. The subscription may include use limitations including the amount of bandwidth allowed per subscriber or per group of subscribers. The amount of bandwidth may be a total amount used over a period of time (e.g. 10 GB), or it may be an average rate aggregated over a period of time (10 Mbps). Typically, when referring to an amount of bandwidth herein, the latter, aggregated rate is intended.

In some cases, a user may need to use more bandwidth than they have allocated to them by their subscription. For instance, remote desktops or remote desktop applications typically use a large amount of bandwidth up front during initialization and loading of applications or desktops. After the initial loading however, data usage tends to be much lower, and bursty in nature. Thus, the token assigning module 106 may be used to provide connections with tokens 113A that allow the subscriber to receive more data up front than would otherwise be permitted by the subscription 102. Each token acts as a stored value of bandwidth, redeemable at the bandwidth assigning module 108 for substantially immediate bandwidth. Thus, if a user uses very little bandwidth over a period of time, the user may build up many tokens that can be redeemed for bandwidth at a later time. Similarly, if a user needs to borrow tokens to "pay" for a burst of data for which the user does not have tokens, the user can borrow the tokens and later pay them back after a period of low bandwidth use.

The bandwidth assigning module 108 may thus assign bandwidth to subscribers 103 (i.e. to their network connections (e.g. 112A)) based on tokens. These tokens are assigned out to network connections (e.g. 112A or 112B) from a pool of tokens 107 which represents the pool of available bandwidth on network 111. The network 111, it will be understood, may be any type of local or distributed network, managed by substantially any type of hardware including routers, switches, gateways, hubs or other equipment. Thus, a token-based credit/debit scheme may be implemented manage bandwidth usage on the network. The token-based credit/debit scheme may be applied to individual users or subscribers, or may be applied on a subscription basis. The token-based credit/debit scheme allows unused data to be credited during periods of bursts, and it also allows active users to take the data usage credits from inactive users. In this manner, a responsive experience may be provided to subscribers, while reducing and limiting overall bandwidth costs.

Various embodiments included herein describe applying data usage limits across a subscription, allowing active users to take inactive users' share of bandwidth while staying within limits for the subscriptions, and allowing users to borrow from quiet periods and send data bursts which may exceed subscription limit at a given instant, but adhere to the subscription limit in aggregate. Thus, a system may be provided which measures aggregate data usage across all users of a subscription (e.g. 102) and, upon measuring the aggregate bandwidth usage, manages the user's future bandwidth usage. The system may be applied automatically or manually by an operator. These concepts will be explained further below with regard to methods 200 and 300 of FIGS. 2 and 3, respectively.

Figure 2:
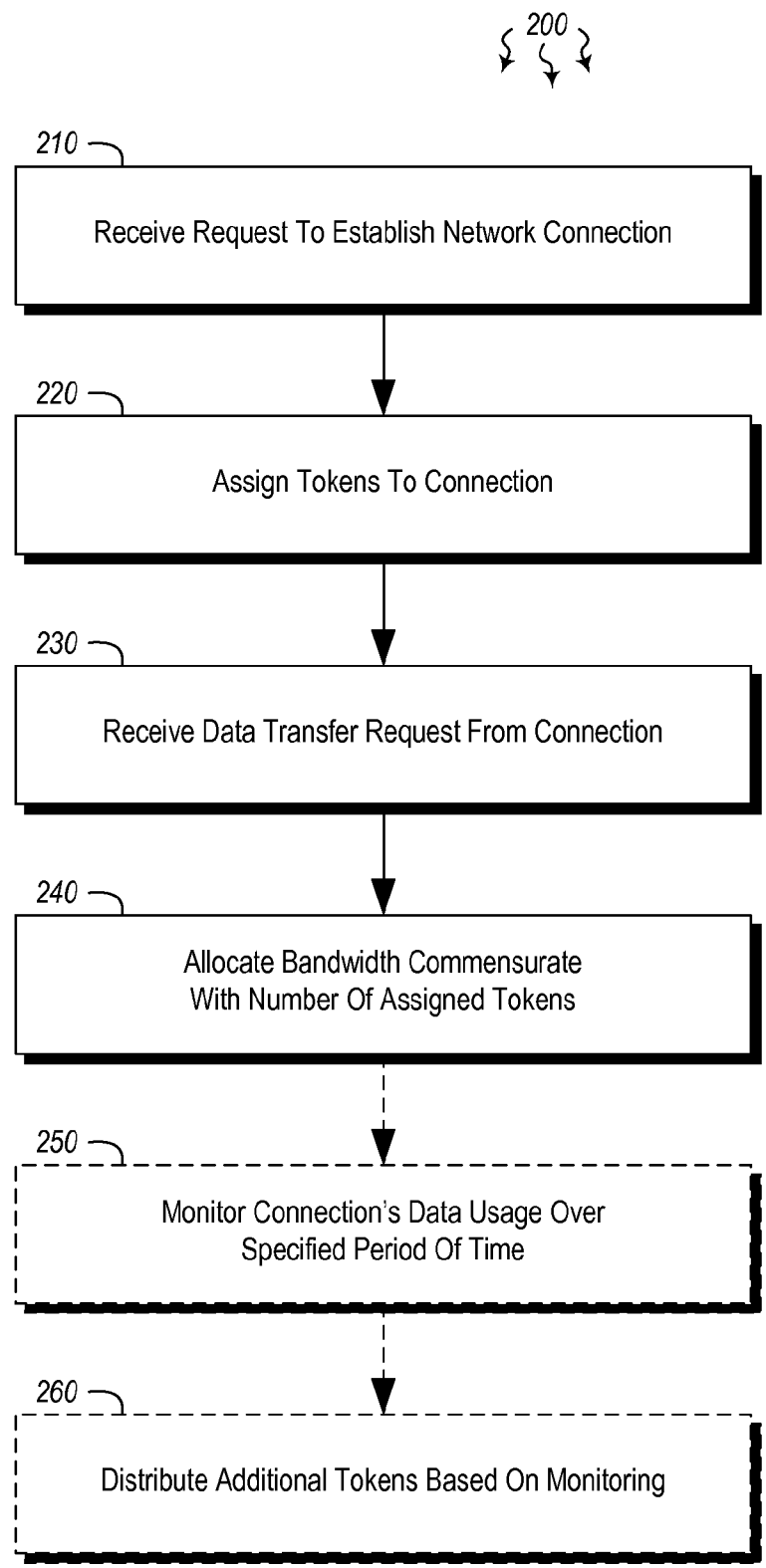
FIG. 2 illustrates a flowchart of an example method for controlling bandwidth usage using a token-based crediting and debiting scheme.
Figure 3:
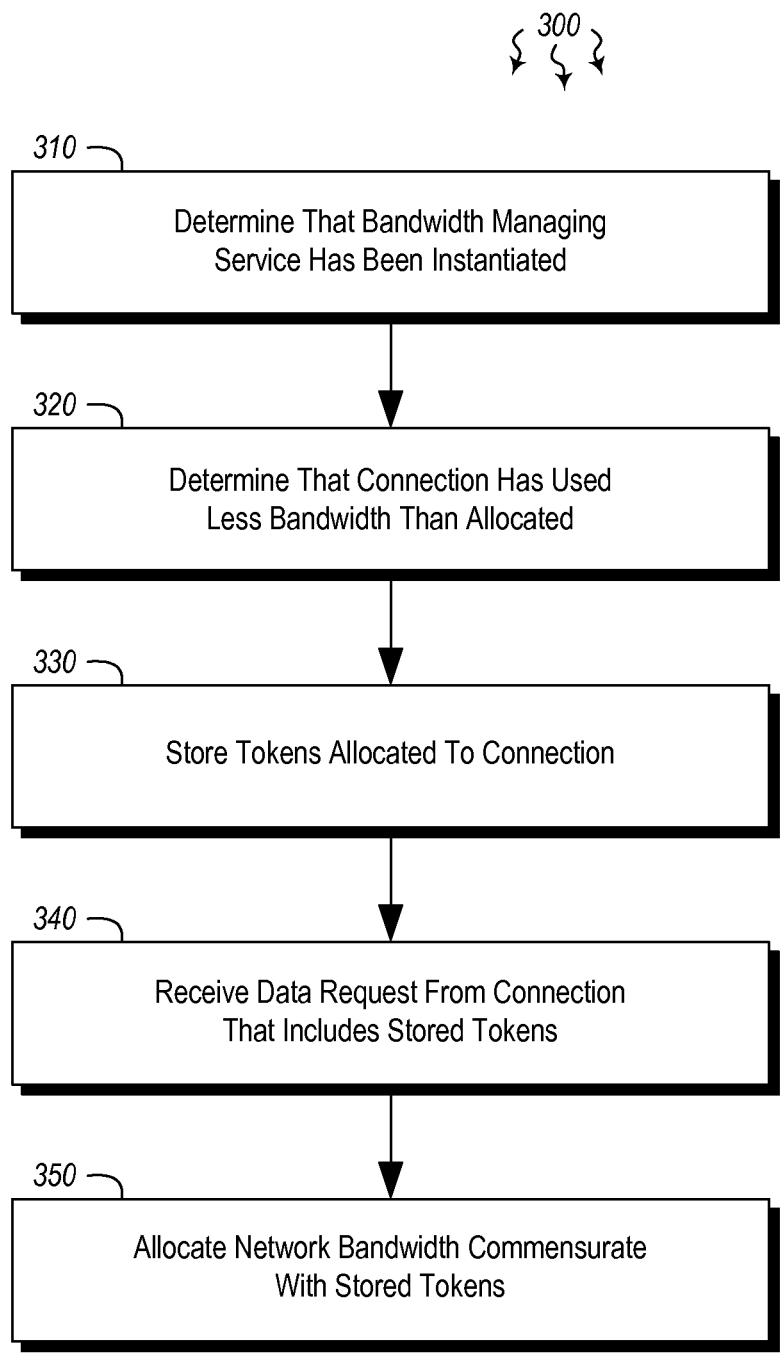
FIG. 3 illustrates a flowchart of an example method for allowing connections to temporarily exceed bandwidth allocations using token credits.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for controlling bandwidth usage using a token-based crediting and debiting scheme. The method 200 will now be described with frequent reference to the components and data of environment 100.

Method 200 includes an act of receiving, at a bandwidth managing service, a request to establish a connection with a network, the connection being associated with one or more subscribers that are part of a subscription (act 210). For example, bandwidth managing service 105 may receive subscriber connection request 104 from one of the subscribers 103. The connection request 104 indicates that the subscriber wishes to establish a connection to network 111. In some cases, the subscriber may be part of a group of subscribers that share a common subscription to web services, cloud-based applications, remote desktop applications or other network-provided resources.

Method 200 further includes an act of the bandwidth managing service assigning one or more tokens to the connection, the tokens being distributed from a pool of tokens that represents a total available bandwidth for the network (act 220). The token assigning module 106 may assign tokens (e.g. 113A, 113B, 116) to different connections used by the subscribers 103. The tokens are distributed from token pool 107, which represents the total available bandwidth for network 111. In some cases, the bandwidth manager may assign the tokens 113A/113B to the connection upon determining that a data read request has been received at the connection's socket. As will be understood by one skilled in the art, each network connection has a socket through which it receives and sends data. This socket may thus receive data such as a data read request or data transfer request 115. The bandwidth managing service 105 receives the data transfer request 115 from the socket (or from any type of user) (act 230). Indeed, the data transfer request may be received from any type of logical user including an administrator, end user or software application over the network connection. The computer system 101 then analyzes the request to determine how many assigned tokens 116 were included with the request.

Based on the number of tokens 116 included in the data request 115, the bandwidth managing service 105 allocates to the connection (e.g. 112A) a specified amount of bandwidth commensurate with the number of assigned tokens provided in the data transfer request (act 240). Thus, if the number of assigned tokens 116 included in the request was a large number, a large amount of bandwidth would be allocated for that data connection. Contrariwise, if a smaller number of assigned tokens 116 are included in the data transfer request 115, a smaller amount of bandwidth will be allocated to that data connection (e.g. 112A). At least in some embodiments, the bandwidth managing service 105 assigns tokens only to active connections. Connections that have tokens assigned to them, however, may keep their tokens even when inactive. These tokens may be stored and used at a later time to receive bandwidth at a connection.

The connection monitoring module 109 and/or the bandwidth managing service 105 may be configured to monitor idle time on the connections (112A/112B). Then, based on the monitoring (and/or previous usage history 110, which may be stored in a local or distributed data store 118), the bandwidth managing service 105 may assign token credits to the idle connections commensurate with the amount of time the connections are idle. Thus, if a connection is idle for a relatively long amount of time, it will be assigned more token credits, and if the connection is only idle for a relatively short amount of time, it will be assigned fewer token credits. This process may be performed dynamically, as new connections are established. Accordingly, idle connections may automatically accrue token credits which may be used for bursts of data traffic at a later time. The connection may exceed its subscription allocation for a limited time using the tokens, and still have its aggregate bandwidth usage in line with the amount specified in its subscription (e.g. 10 Mbps average, aggregated over one month).

Method 200 further includes an optional act of the bandwidth managing service monitoring the connection's data usage over a specified period of time (act 250). As mentioned above, the connection monitoring module 109 or the bandwidth managing service 105 may monitor any connection's data usage over a certain time frame. The bandwidth managing service may then distribute tokens upon determining that the connection is substantially likely to request subsequent additional tokens (act 260). Thus, for example, if a connection has consistently used a large amount of bandwidth in the past, or at least has used a consistent amount of bandwidth, the bandwidth managing service may determine that the connection is highly likely to request tokens in the future. In such cases, the bandwidth managing service 105 may preemptively assign tokens to that connection. As a result, the connection will not have to wait to be assigned additional tokens, since the bandwidth managing service will already have assigned them.

As mentioned above, some applications (including remote desktop applications or web services) are inherently bursty. These applications require a larger amount of data 114A/114B up front for initialization, and a much smaller amount of data to maintain the connection and interact with the application. In such cases, a specified amount of additional bandwidth may be provided to new connections (e.g. 112B) to allow for connection initialization. This additional bandwidth may be borrowed from the pool of tokens 107. The bandwidth managing service may adjust the number of tokens assigned 116 to each connection 112A/112B dynamically. This adjustment may be implemented at a defined rate, even as the number of connections changes.

Figure 4:
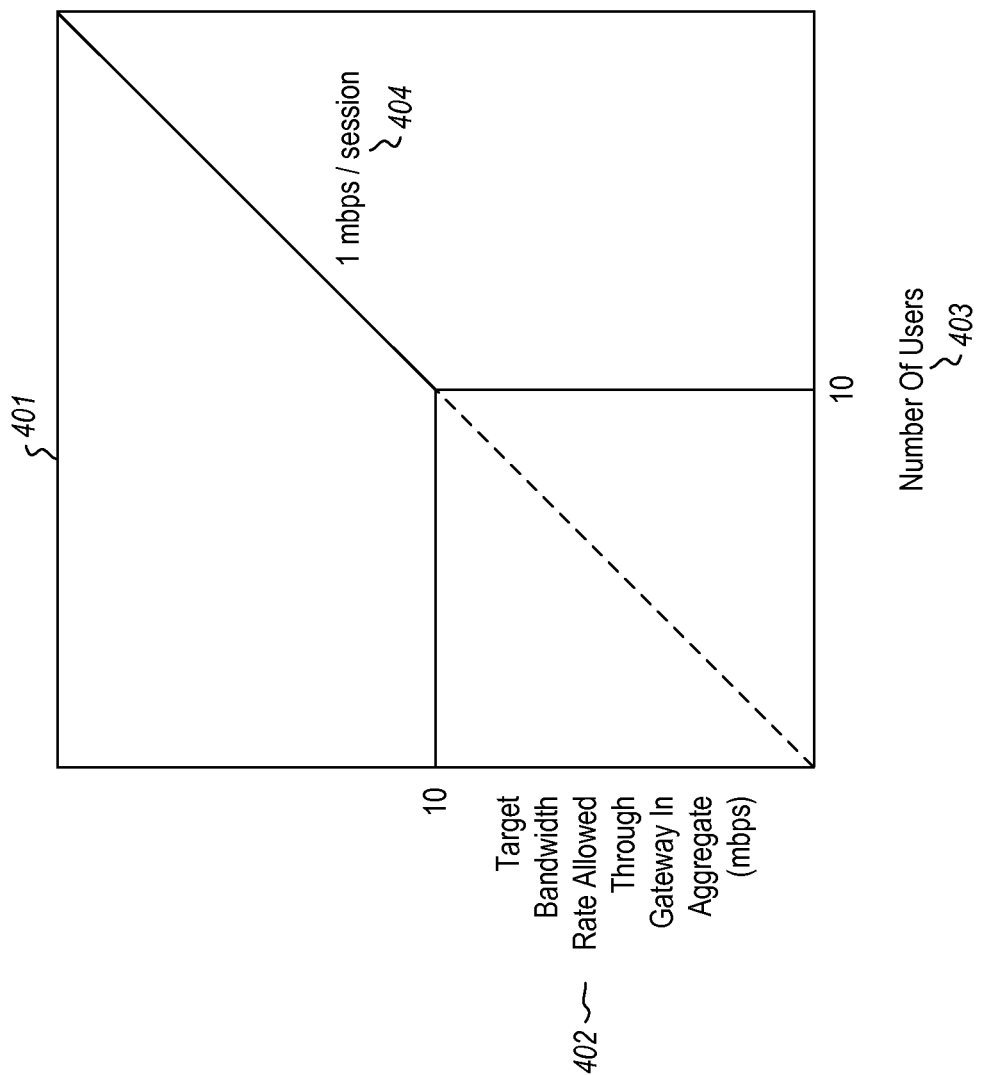
FIG. 4 illustrates an embodiment in which a target bandwidth rate is implemented.

For example, in FIG. 4, chart 401 shows a number of users 403 (e.g. subscribers 103) on the x axis, and the target bandwidth rate 402 on the y axis (e.g. 10 Mbps). The bandwidth managing service 105 may adjust the number of assigned tokens upward at a defined slope. In FIG. 4, the slope is defined as 1 Mbps/session (404). Accordingly, in the example of FIG. 4, the target bandwidth rate would increase 1 Mbps per new user (i.e. per new connection). Similarly, the target bandwidth rate would be decreased by 1 Mbps per terminated connection. It should be noted that the numbers chosen for the example shown in FIG. 4 are arbitrary, and that substantially any numbers may be used for the target bandwidth rate, or for the intended slope. Indeed, the slope may not be linear, and may increase or decrease logarithmically or according to some other rate as the number of users increases or decreases.

It should also be noted that an aggregated amount of data may be determined over a specified time period. For example, if the specified time period is one month, the subscriber has the entire month to reach the aggregated amount (i.e. in Mbps or Gbps, or some other measure). Thus, if the subscriber did not use their connection for 20 days of the month, they would be able to use the whole months' worth of allocated bandwidth in the remaining 8-11 days of the month, using their accrued tokens. In such cases, if the subscriber were to exceed their subscription allocation for the last 8-11 days, the bandwidth managing service 105 would borrow tokens from inactive connections to ensure that the active connection had sufficient bandwidth. In cases where a subscription has a certain allocation (e.g. 50 Mbps/month), and that subscription has multiple users, the aggregated bandwidth for a subscriber is measured across each of the users for that subscription. Thus, some heavy data users among the subscribers 103 in that subscription 102 may receive more bandwidth, while light data users may receive less. Exceeding subscription allocations will be discussed further below with regard to FIG. 3).

FIG. 3 illustrates a flowchart of a method 300 for allowing connections to temporarily exceed bandwidth allocations using token credits. The method 300 will now be described with frequent reference to the components and data of environment 100.

Method 300 includes an act of determining that a bandwidth managing service has been instantiated, the bandwidth managing service being configured to assign tokens to requesting connections, the tokens being distributed from a pool of tokens that represents a total available bandwidth for a network (act 310). The bandwidth managing service 105 or the token assigning module 106 may assign tokens (e.g. 113A) to connections (e.g. 112A). The tokens are assigned from token pool 107. The bandwidth managing service 105 may then determine that a specified connection has used less than an allocated, aggregated amount of bandwidth over a specified period of time (act 320). For instance, connection 112B may have transferred substantially less than an allocated 25 Mbps over a weeks' time. The bandwidth managing service 105 stores tokens allocated to the connection, which form credits from which bandwidth for data transfers is to be drawn (act 330). These credits may lie dormant for an unspecified amount of time, and then used when needed. These stored tokens may allow the user to exceed their allocated bandwidth temporarily, to the amount indicated by the tokens 116.

Method 300 further includes an act of the bandwidth managing service 105 receiving a data request 115 from the connection, the data request including one or more of the stored tokens 116 indicating that credits are to be used to receive bandwidth allocation for a data transfer (act 340). The bandwidth managing service 105 may then allocate a specified amount of network bandwidth to the connection commensurate with the stored tokens received in the data request (act 350). This bandwidth may be allocated to the connection (e.g. 112B) even if the connection is temporarily exceeding its bandwidth allotment. In such cases, the connection borrows bandwidth tokens against a subsequent time when the connection's data transfer rate will be lower. Thus, when an application provided over network 111 is initiated, additional data may be transferred over the connection, after which data traffic may slow down. When the bandwidth assigning module 108 assigns a certain amount of bandwidth to a connection, it may send an indication 117 to that connection (or to the subscriber that initiated the connection) of the amount of bandwidth that was assigned.

In some cases, the bandwidth assigning module 108 may look at a data usage history 110 for the connection to ascertain how much data the connection has used in the past, and when the data was transferred. The bandwidth assigning module 108 may further determine one or more metrics for the connection's data usage such as a weighted average. Then, based on the determined metric (e.g. weighted average), the bandwidth managing service 105 may gradually raise or lower the connection's data usage down to a specified, aggregate data usage over a specified period of time.

As shown in FIG. 4, and as explained above, this adjustment (downwards or upwards) may be performed according to a predefined slope or rate, such that the target bandwidth rate 402 allowed through the network 111 in aggregate is adjusted in line with the number of connections or users 403. As such, in cases where the slope is linear, the connection's data usage may be increased or decreased evenly according to a defined upward or downward slope. In some cases it should also be noted, a floor may be implemented such that the aggregate bandwidth permitted does not go below a minimum amount or a minimum rate. For example, in FIG. 4, the floor is 10 Mbps, and this is the amount of data allowed even if less than 10 users are connected. In this manner, the bandwidth managing service 105 may provide cost control for bandwidth involved in delivering cloud-based applications or services, while allowing data bursting beyond an allotted amount when needed.

It should further be noted that, at least in some embodiments, bandwidth quotas may be enforced across multiple subscribers and across multiple subscriptions. For instance, a certain business or other entity may have multiple subscriptions with a particular network 111 or set of applications hosted on that network. Each of those subscriptions may allow many different users to access the network 111 and/or the applications hosted thereon. The bandwidth managing service 105 may be configured to enforce bandwidth quotas across the subscribers using the pool of tokens. Indeed, the bandwidth managing service 105 assigns tokens 113A/113B to each of the network connections established 112A/112B. Then, as data requests are received from the various subscribers (of the same or different subscriptions), the bandwidth managing service 105 allocates bandwidth to the connections in accordance with the tokens presented in the data request. The bandwidth managing service 105 may thus enforce bandwidth limits or quotas for multiple subscribers and multiple subscriptions.

Still further, the bandwidth managing service 105 may provide certain subscribers a higher share of bandwidth if such is dictated in a quality of service agreement (QoS). For example, a subscriber 103 may establish a QoS agreement with the network 111, indicating that a certain level of service will be guaranteed for that subscriber's connections. Then, when the subscriber is consuming data, the bandwidth managing service 105 may ensure that the QoS is maintained. The bandwidth managing service 105 may maintain these bandwidth quotas or QoS agreements across subscribers within a particular subscription, and/or may maintain quotas and QoS agreements across subscriptions. Accordingly, regardless of the number of subscriptions or subscribers that are part of a subscription, the bandwidth managing service 105 may set and maintain bandwidth quotas and limits, and may further provide higher bandwidth allocations to subscriptions where a QoS agreement is in place.

Accordingly, methods, systems and computer program products are provided which control bandwidth usage using a token-based crediting and debiting scheme. Moreover, methods, systems and computer program products are provided which allow connections to temporarily exceed bandwidth allocations using stored token credits.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer-implemented method for controlling bandwidth usage for network connection services available to one or more subscribers of a subscription provided by a computing system, the computer-implemented method being performed by one or more processors executing computer executable instructions for the computer-implemented method, and the computer-implemented method comprising:

receiving a subscriber request to establish a connection with a network, the requested network connection being associated with one or more subscribers that are part of a subscription;

assigning one or more tokens to the requested network connection, each token representing a stored value of bandwidth, the tokens being distributed from a pool of tokens shared by all of the one or more subscribers of the subscription, and the pool of tokens representing a total available bandwidth for network connections available for the one or more subscribers;

receiving a data transfer request from one of the one or more subscribers to transfer data over the requested network connection, the data transfer request including the one or more assigned tokens; and allocating to the requested network connection a specified amount of bandwidth based on a number of tokens assigned from the pool of tokens commensurate with the number of the one or more assigned tokens provided in the data transfer request, even though the specified amount of bandwidth allocated is temporarily greater than an amount of bandwidth otherwise assigned to the requested network connection.

2. The computer-implemented method of claim 1, wherein the one or more tokens assigned to the requested network connection are assigned upon determining that a data read request has been received at a socket of the requested network connection.

3. The computer-implemented method of claim 1, wherein the tokens are assigned only to active network connections.

4. The computer-implemented method of claim 1, further comprising monitoring idle time on one or more network connections of the one or more subscribers.

5. The computer-implemented method of claim 4, wherein token credits are assigned to the idle network connections commensurate with the amount of time the network connections are idle, up to a predefined maximum number of tokens.

6. The computer-implemented method of claim 1, wherein the pool of tokens is dynamically allocated using tokens as new network connections are established.

7. The computer-implemented method of claim 1, further comprising:
monitoring a network connection's data usage over a specified period of time;
storing the bandwidth usage for the monitored network connection;
accessing the stored bandwidth usage to determine whether the monitored network connection is substantially likely to request subsequent additional tokens; and
upon determining that the monitored network connection is substantially likely to request subsequent additional tokens, assigning one or more tokens to the monitored network connection.

8. The computer-implemented method of claim 1, wherein a specified amount of additional bandwidth is provided to new network connections to allow for connection initialization.

9. The computer-implemented method of claim 8, wherein one or more tokens are borrowed from the pool of tokens to provide the new network connections with the additional bandwidth.

10. The computer-implemented method of claim 1, further comprising adjusting the number of tokens assigned to each network connection at a defined rate as the number of network connections changes.

11. The computer-implemented method of claim 1, wherein aggregate data usage for each network connection is controlled over a specified period of time.

12. The computer-implemented method of claim 1, wherein tokens assigned to a given network connection are retained by that given network connection as credits for subsequent bandwidth usage.

13. A system architecture that controls bandwidth usage for network connection services available to one or more subscribers of a subscription provided by a computing system, wherein the system architecture instantiates at the computer system a bandwidth managing service that performs the following:
assign tokens to a subscriber's requested network connection, each token representing a stored value of bandwidth, the tokens being distributed from a pool of tokens shared by all the one or more subscribers of the subscription, and the pool of tokens representing a total available bandwidth for network connections available under the subscriptions for the one or more subscribers;
determines that a requested network connection has used less than an allocated, aggregated amount of bandwidth over a specified period of time;
stores one or more tokens representing credits for unused bandwidth from one or more network connections of the one or more subscribers included within the subscription, the tokens representing credits available from the pool of tokens as needed for bandwidth for data transfers using network connections of any of the one or more subscribers;
receives a data transfer request from one of the one or more subscribers, the data transfer request including one or more of the stored tokens indicating that credits are to be used to receive bandwidth allocation for the received data transfer request; and
allocates a specified amount of network bandwidth to a requested network connection to be used for the received data transfer request, the specified amount of bandwidth being commensurate with the one or more stored tokens included in the received data transfer request.

14. The computer system of claim 13, wherein the bandwidth managing service allocates the specified amount of network bandwidth to the requested network connection even if the requested network connection will temporarily exceed its bandwidth allotment.

15. The computer system of claim 13, wherein the one or more tokens included in the received data transfer request include one or more tokens borrowed against a subsequent time when the requested network connection's data transfer rate will be lower.

16. The computer system of claim 13, wherein the bandwidth managing service further performs the following:
accesses one or more portions of data usage history for a network connection; and
determines a metric based on the data usage history.

17. The computer system of claim 16, wherein the bandwidth managing service gradually lowers a network connection's data usage down to a specified, aggregate data usage over a specified period of time.

18. A computer-implemented method for allowing a subscriber that is one of a plurality of subscribers to temporarily exceed bandwidth allocation assigned to the subscriber for a given network connection, the computer-implemented method being performed by one or more processors executing computer-executable instructions which cause the one or more processors to perform the computer-implemented method, which comprises:
generating a pool of tokens representing total bandwidth available to the plurality of subscribers based on the given subscription, wherein the pool of tokens is shared by the plurality of subscribers so that tokens may be allocated to network connections requested by any of the plurality of subscribers;
each token representing a portion of bandwidth that is available based on monitoring bandwidth usage for network connections available to the plurality of subscribers, and wherein the tokens in said pool are determined by one or both of the following:
monitored active network connections that use less bandwidth than otherwise allocated to the active network connection, with a first type of token representing unused bandwidth of the monitored active network connection; and
monitored inactive network connections that use no bandwidth otherwise allocated to the inactive network connection, with a second type of token representing unused bandwidth of the monitored inactive network connection; and when a given subscriber initiates a request for a network connection for a desired data transfer, allocating from said pool of tokens a sufficient number of the first or second types of tokens, or both, to provide necessary bandwidth for the desired data transfer, even if the necessary bandwidth temporarily exceeds a bandwidth limit assigned to the requested network connection.

19. A computer system which comprises one or more hardware logic components which provide an architecture for allowing a subscriber that is one of a plurality of subscribers to temporarily exceed bandwidth allocation assigned to the subscriber for a given network connection, the architecture comprising:

a given subscription for a plurality of subscribers, the given subscription permitting individual subscribers to initiate connection requests with the computing system for desired data transfers at specified bandwidths assigned to each network connection in accordance with the given subscription;

at a connection monitor, monitoring network connections of a plurality of subscribers which connect to the computer system to perform desired data transfers;

a pool of tokens generated to represent total bandwidth available to the plurality of subscribers based on the given subscription, wherein the pool of tokens is shared by the plurality of subscribers so that tokens may be allocated to network connections requested by any of the plurality of subscribers;

each token representing a portion of bandwidth that is available based on monitoring bandwidth usage for network connections available to the plurality of subscribers, and wherein the tokens in said pool are determined by one or both of the following:

monitored active network connections that use less bandwidth than otherwise allocated to the active network connection, with a first type of token representing unused bandwidth of the monitored active network connection; and monitored inactive network connections that use no bandwidth otherwise allocated to the inactive network connection, with a second type of token representing unused bandwidth of the monitored inactive network connection;

when a given subscriber initiates a request for a network connection for a desired data transfer, a token assignment module allocating from said pool of tokens a sufficient number of the first or second types of tokens, or both, to provide necessary bandwidth for the desired data transfer, even if the necessary bandwidth temporarily exceeds a bandwidth limit assigned to the requested network connection; and a bandwidth assignment module assigning a bandwidth for the requested network connection for the desired data transfer, where the assigned bandwidth is commensurate with the sufficient number of the first or second types of tokens, or both, to provide the necessary bandwidth for the desired data transfer.

\* \* \* \* \*